United States Patent
Park et al.

(10) Patent No.: US 7,298,759 B2
(45) Date of Patent: Nov. 20, 2007

(54) APPARATUS FOR GENERATING TIME SLOT IN HOME NETWORK SYSTEM AND METHOD THEREOF

(75) Inventors: Chan-won Park, Daejon (KR); Jong-won Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 869 days.

(21) Appl. No.: 10/189,124

(22) Filed: Jul. 2, 2002

(65) Prior Publication Data

US 2003/0200306 A1   Oct. 23, 2003

(30) Foreign Application Priority Data

Apr. 17, 2002   (KR) ............................... 2002-20905

(51) Int. Cl.
   *H04L 12/43*   (2006.01)
   *H04L 12/413*  (2006.01)
   *G06F 15/173*  (2006.01)
(52) U.S. Cl. .................. 370/458; 370/376; 370/445; 709/224; 714/25
(58) Field of Classification Search ................ 370/376, 370/445, 458, 447, 456, 463, 444; 709/226, 709/223, 224, 229, 235; 714/25, 26
   See application file for complete search history.

(56) References Cited

U.S. PATENT DOCUMENTS 3,700,820 A * 10/1972 Blasbalg et al. ............ 370/468

(Continued)

FOREIGN PATENT DOCUMENTS

JP    4-68836    3/1992

(Continued)

OTHER PUBLICATIONS

A design of time slot generator for HomePNA2.0 Protocol, 5 pages.

*Primary Examiner*—Afsar Qureshi
(74) *Attorney, Agent, or Firm*—Blakely, Sokoloff, Taylor & Zafman (57) ABSTRACT

An apparatus for generating a time slot in a home network system using home PNA 2.0 protocol and a method thereof are provided. The apparatus for generating a time slot includes a signal analyzer which receives a carrier sense signal indicating whether or not data exists on a network line, generates a counter control signal according to the level of the carrier sense signal, outputs a state signal for indicating whether or not effective data is received, whether or not data collision occurs, or whether or not an error happens to the carrier sense signal and a time counting value for generating a time slot using counter values provided in response to the carrier sense signal, a counting unit which counts a clock signal in response to the counter control signal and outputs the result of the counting as the counter values with respect to the length of a first level of the carrier sense signal and the length of a second level of the carrier sense signal where the second level is complementary to the first level, and a time slot generator which has regulations related to the period of time of each section of a time slot, generates a time slot according to the state signal output from the signal analyzer using the time counting value to meet the regulations, and stops generation of the time slot in response to the state signal for indicating that an error happens to the carrier sense signal. Accordingly, it is possible to generate a reliable time slot by controlling generation of a time slot based on whether or not an error occurs to a carrier sense signal being currently received and taking the amount of time delayed inside a device including the apparatus for generating a time slot into consideration.

18 Claims, 3 Drawing Sheets

U.S. PATENT DOCUMENTS

| | | | | |
|---|---|---|---|---|
| 4,357,700 A | * | 11/1982 | Alvarez et al. | 370/317 |
| 4,370,648 A | * | 1/1983 | Wagner et al. | 340/825.2 |
| 4,773,003 A | * | 9/1988 | Hauge | 714/46 |
| 5,058,106 A | * | 10/1991 | Cole | 370/304 |
| 5,912,890 A | * | 6/1999 | Park | 370/375 |
| 6,006,271 A | * | 12/1999 | Grabiec et al. | 709/235 |
| 6,091,740 A | * | 7/2000 | Karasawa | 370/458 |

FOREIGN PATENT DOCUMENTS

| | | |
|---|---|---|
| JP | 05-160840 | 6/1993 |
| JP | 06-090239 | 3/1994 |
| JP | 06-276199 | 9/1994 |
| JP | 2001-86121 | 3/2001 |
| JP | 2001-251332 | 9/2001 |
| KR | 10-1997-0062275 | 11/1997 |
| KR | 10-1998-0054199 | 12/1998 |
| KR | 10-1999-0019547 | 5/1999 |
| KR | 10-1999-7010642 | 11/1999 |

* cited by examiner

APPARATUS FOR GENERATING TIME SLOT IN HOME NETWORK SYSTEM AND METHOD THEREOF

BACKGROUND OF THE INVENTION

1. Field of the Invention

The present invention relates to a network system, and more particularly, to an apparatus for generating a time slot in a network system for information terminals using a home phone network application (PNA) 2.0 protocol, which is included in each of the information terminal and indicates the time when data is transmitted, and a method thereof.

2. Description of the Related Art

Recently, home PNA 2.0 protocol has been suggested to constitute a home network. The home PNA 2.0 protocol, unlike home PNA 1.0 protocol, generates a time slot for determining when data will be transmitted to minimize the probability of data collision occurring between stations. The home PNA 2.0 protocol can transmit certain data after giving priority on the certain data using the time slot and thus can improve the quality of the transmitted data.

A time slot in the home PNA 2.0 protocol is generated using a carrier sense signal. However, it may be possible to generate a wrong carrier sense signal due to noise on a phone line. As a result, a wrong time slot may be generated by the wrong carrier sense signal. Therefore, it is important to generate a correct time slot irrespective of various carrier sense signals some of which may include errors.

SUMMARY OF THE INVENTION

To solve the above-described problems, it is a first object of the present invention to provide an apparatus for generating a time slot in a network system based on home PNA 2.0 protocol, which is included in each information terminal and indicates the time when data is transmitted, and a method thereof.

It is a second object of the present invention to provide a recording medium, on which the method for generating a time slot is recorded as program codes that can be processed in a computer.

To achieve the first object, there is provided an apparatus for generating a time slot in a home networking system for networking of information terminals, which is included in each of the information terminals and shows the time when data is transmitted. The apparatus includes a signal analyzer which receives a carrier sense signal indicating whether or not data exists on a network line, generates a counter control signal according to the level of the carrier sense signal, outputs a state signal for indicating whether or not effective data is received, whether or not data collision occurs, or whether or not an error happens to the carrier sense signal and a time counting value for generating a time slot using counter values provided in response to the carrier sense signal, a counting unit which counts a clock signal in response to the counter control signal and outputs the result of the counting as the counter values with respect to the length of a first level of the carrier sense signal and the length of a second level of the carrier sense signal where the second level is complementary to the first level, and a time slot generator which has regulations related to the period of time of each section of a time slot, generates a time slot according to the state signal output from the signal analyzer using the time counting value to meet the regulations, and stops generation of the time slot in response to the state signal for indicating that an error happens to the carrier sense signal.

To achieve the second object, there is provided a method for generating a time slot performed in an apparatus for generating a time slot which is included in each information terminal and shows the time when data is transmitted in a home networking system for networking of information terminals. The method includes (a) determining whether or not effective data is received, whether or not data collision occurs, or whether or not an error happens to the carrier sense signal using the carrier sense signal indicating whether or not data exists on a network line, (b) generating a time slot corresponding to the result of the determination if it is determined that effective data is received or it is determined that data collision occurs, and (c) stopping generation of the time slot if it is determined that an error happens to the carrier sense signal, and standing by to generate a new time slot.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, the present invention will now be described more fully with reference to the accompanying drawings.

Figure 1:
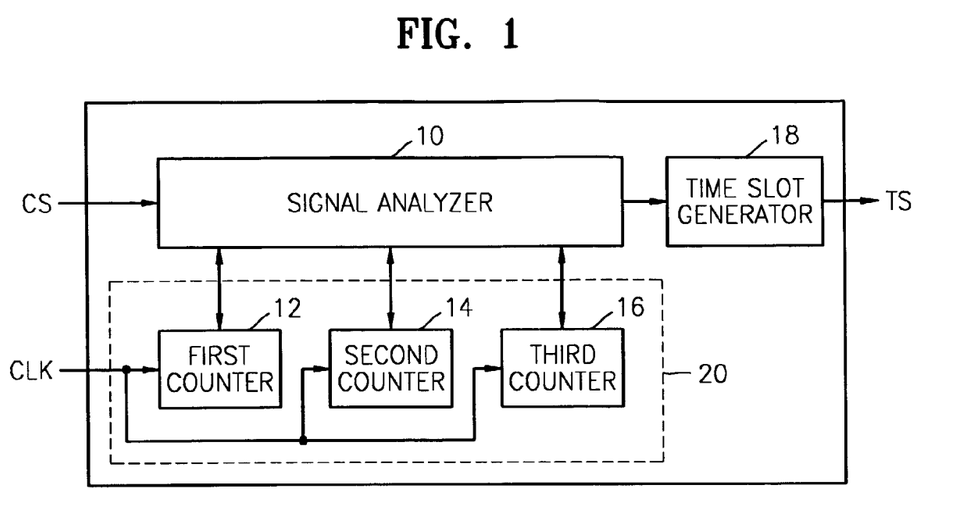
FIG. 1 is a block diagram of an apparatus for generating a time slot according to an embodiment of the present invention.

FIG. 1 is a block diagram of an apparatus for generating a time slot according to an embodiment of the present invention. Referring to FIG. 1, the apparatus for generating a time slot includes a signal analyser 10, a counting unit 20 having first through third counters 12, 14, and 16, and a time slot generator 18.

Referring to FIG. 1, the signal analyser 10 receives a carrier sense signal CS, which indicates whether or not data exists on a network line, and generates first through third counter control signals CNT1 through CNT3 for controlling the first through third counters 12 through 16, respectively, according to the state of the carrier sense signal. In addition, the signal analyser 10 outputs a state signal S1, which indicates whether or not normal data is received, whether or not data collision occurs, or whether or not noise is generated, and a time counting value for generating a time slot to the time slot generator 18 in response to the outputs of the first through third counters 12 through 16.

The counting unit 20 counts a clock signal CLK in response to the first through third counter control signals CNT1 through CNT3 and outputs the results as counter values with respect to the lengths of the low and high sections of the carrier sense signal CS to the signal analyser 10. Specifically, the counting unit 20 includes the first through third counters 12 through 16. The first through third counters 12 through 16 count the clock signal CLK having a predetermined frequency, for example, a frequency of 16 MHz, in response to the first through third counter control signals CNT1 through CNT3, respectively, and output the results. The first counter 12 counts the clock signal CLK in the high section of the carrier sense signal CS in response to the first counter control signal CNT1, and the second and third counters 14 and 16 count the clock signal CLK in the low section of the carrier sense signal CS in response to the second and third counter control signals CNT2 and CNT3, respectively. The second counter 14 counts the clock signal CLK in the low section of the carrier sense signal CS just before an interframe gap (IFG) is detected in response to the second counter control signal CNT2, and the third counter 16 counts the clock signal CLK in the low section of the carrier sense signal CS directly after the IFG is detected in response to the third counter control signal CNT3. The result of counting the clock signal using the third counter 16 is used as the time counting value.

The time slot generator 18 memorizes time regulations for each section of a time slot and generates a time slot based on the state signal S1 output from the signal analyser 10 to meet the time regulations by using the time counting value output from the signal analyser 10. In other words, the time slot generator 18 can recognize whether or not effective data is received or whether or not data collision occurs based on the state signal S1 and generates a time slot based on whether or not effective data is received or whether or not data collision occurs.

FIGS. 2(a) through 2(d) are diagrams showing various carrier sense signals CS. Referring to FIGS. 2(a) through 2(d), a carrier sense signal CS is maintained at a high level during data is received. In a case where normal data is received, as shown in FIG. 2(a), the carrier sense signal CS is maintained at a high level for at least 92.5 µs. After the data is completely received, the carrier sense signal CS is maintained at a low level for at least 29 µs, which represents an interframe gap (IFG) section.

In a case where data collision occurs, as shown in FIG. 2(b), the carrier sense signal CS is maintained at a high level for 32-92.5 µs. After data is completely received, the carrier sense signal CS must be maintained at a low level for at least 29 s. If the carrier sense signal CS is maintained at a low level for less than 29 µs in a section 201 where an IFG section is supposed to exist, a time slot is determined to have an error. In this case, a home PNA terminal must abandon the time slot currently used and must generate a new time slot. If a terminal using a wrong time slot exists on a network, the terminal negatively affects the whole network, and thus the network falls into confusion. In addition, if data collision occurs, a back-off signal (BOS) section 202 exists. In the BOS section 202, a maximum of three carrier sense signals CS of 10 µs may be generated. If there is no carrier sense signal CS, four or more carrier sense signal CS are generated, or a carrier sense signal CS greater than 10 µs exists in the BOS section 202, a time slot is determined to have errors. Therefore, a new time slot must be generated.

FIG. 2(c) is a timing diagram of a carrier sense signal in a case where data collision occurs after data is normally received, and FIG. 2(d) is a timing diagram of a carrier sense signal in a case where data is normally received after data collision occurs.

Figure 2:
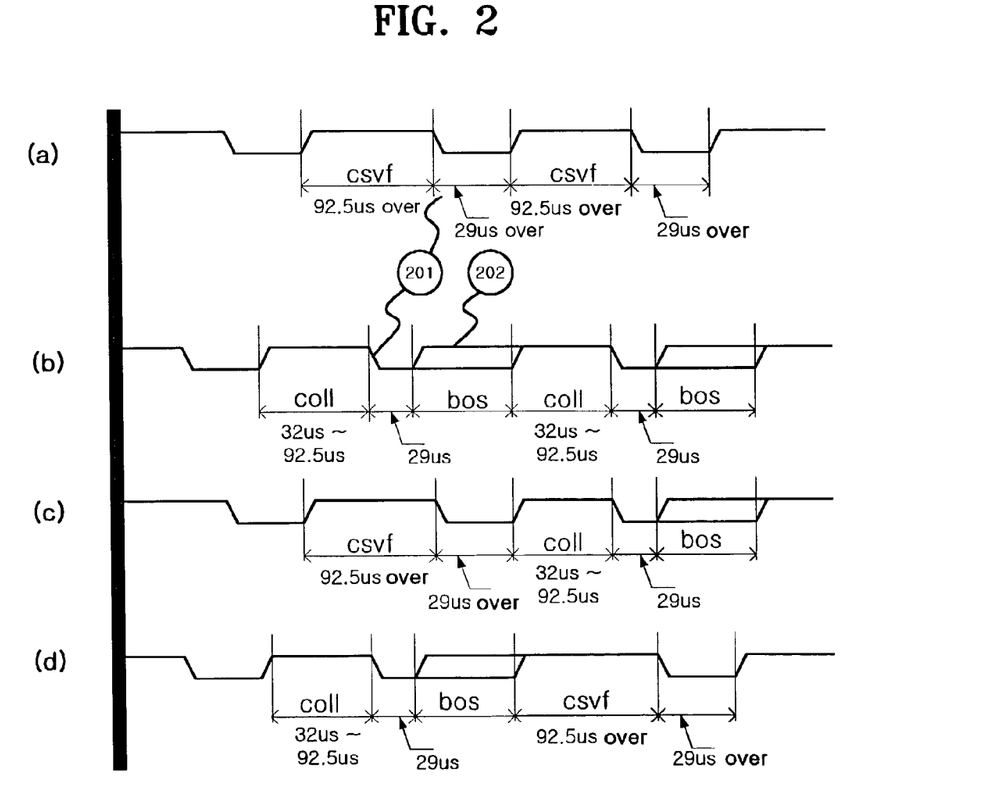
FIGS. 2(a) through 2(d) are diagrams showing carrier sense signals.

Referring to FIGS. 1 and 2, the signal analyzer 10 determines whether or not a carrier sense signal CS currently input has an error by comparing the shape of the currently input carrier sense signal CS with the shapes of the carrier sense signals shown in FIG. 2. Then, the signal analyzer 10 outputs the result to the time slot generator 18 and thus can prevent the time slot generator 18 from generating a time slot in response to a wrong carrier sense signal CS.

Figure 3:
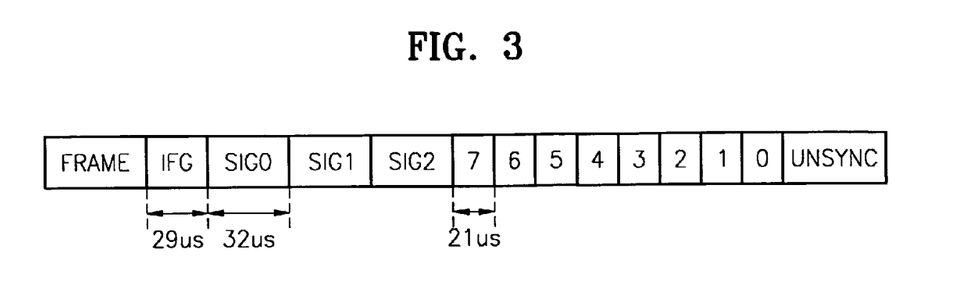
FIG. 3 is a diagram showing a time slot suggested by home PNA 2.0 standards.

FIG. 3 is a diagram showing a time slot suggested by home PNA 2.0 standards. According to the home PNA 2.0 standards, a time slot is supposed to have an IFG section that lasts for 29 µs at one end of a frame. In a case where data collision occurs, three BOS sections SIG0, SIG1, and SIG2 sequentially follow the IFG section, and each of the BOS sections SIG0, SIG1, and SIG2 lasts for 32 µs. Eight priority slots, which will be loaded with data desired to be transmitted, follow the BOS sections SIG0, SIG1, and SIG2. In other words, a home PNA terminal decides the priority ranking of data desired to be transmitted and transmits the data according to the priority ranking and between the priority ranking, time delay for 21 µs exists. For example, data holding the seventh rank is transmitted directly after the BOS sections SIG0, SIG1, and SIG2, and data holding the fifth rank is transmitted 42 µs later from the BOS sections SIG0, SIG1, and SIG2.

In a case where data collision does not occur, eight priority slots directly follow the IFG section without the BOS sections SIG0, SIG1, and SIG2 intervening between the IFG section and the eight priority slots. In a case where the priority slots are not loaded with data, an unsynchronous section where data can be transmitted any time irrespective of the time slot comes after the priority slots.

Figure 4:
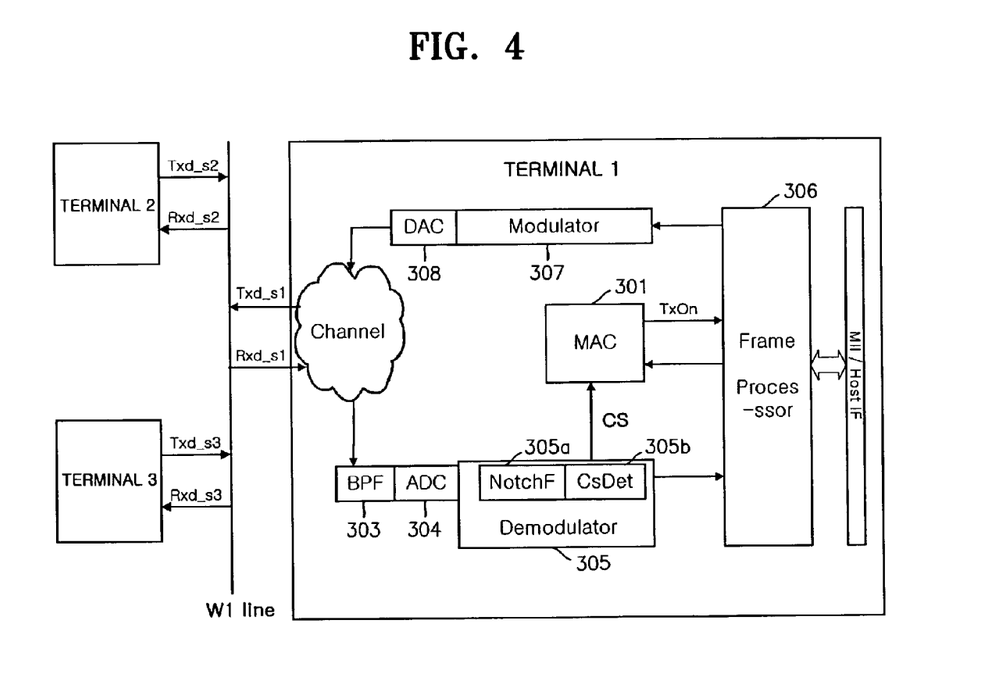
FIG. 4 is a block diagram of a network system based on home PNA 2.0 protocol.

FIG. 4 is a block diagram of a home network system based on home PNA 2.0 protocol. Referring to FIG. 4, all terminals including active terminals, which get ready to transmit data, and passive terminals, which have no plan to transmit data, generate time slots using received signals and use the time slots.

Referring to FIG. 4, in a case where terminal 1 (120) is an active terminal, data is transmitted in the following way. Received data passes through a channel 302, and a carrier sense signal detected through a bandwidth pass filter 303, an ADC 304, and a notch filter 305a and a carrier sense signal detector 305b of a demodulator 305 is output to a MAC 301. The received data is output to a frame processor 306. The MAC 301 includes the apparatus for generating a time slot shown in FIG. 1, and the apparatus for generating a time slot generates a time slot using the carrier sense signal CS received from the demodulator 305 and outputs the time slot to the frame processor 306. The frame processor 306 can determine the time TxOn when data will be transmitted based on the time slot provided by the MAC 301 and transmits the data to a modulator 307 according to the time slot. The data is transmitted to an object terminal via a DAC 308 and the channel 302.

According to the home PNA 2.0 standards, the transmission of a BOS section and a priority slot section must be started within 4 µs after the starting point of each time slot when being measured in a W1 line shown in FIG. 4. Accordingly, terminal designers must design terminals so that time delay caused by each of the terminals can be no greater than 4 µs. However, the time delay caused by each of the terminals may be no less than 4 µs according to the designers, and thus it is impossible to meet the regulation related to the transmission of the BOS section and the priority slot section. For example, in the case of the terminal 1 (120) shown in FIG. 4, data is transmitted via the modulator 307, the DAC 308, and the channel 302. During the data passes through the modulator 307, the DAC 308, and the channel 302, the transmission of the BOS section and the priority slot section may not be started within 4 μs after the starting point of each time slot when being measured in the W1 line.

Figure 5:
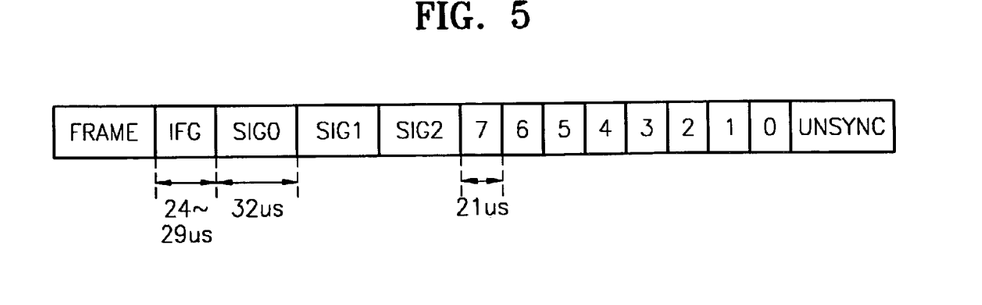
FIG. 5 is a diagram showing a time slot in an apparatus for generating a time slot according to the present invention.

FIG. 5 is a diagram showing a time slot generated by an apparatus for generating a time slot according to the present invention, in which a BOS section or a priority slot section begins directly after an IFG section that lasts for 29 μs in a W1 line irrespective of time delay caused by a terminal.

Referring to FIGS. 4 and 5, the time generator according to the present invention can select the period of time, for which an IFG section lasts, from between 24 μs and 29 μs. If data transmission is delayed by as much as 2 μs by a terminal, the IFG section is adjusted to last for 26 μs. On the other hand, if data transmission is delayed by as much as 5 μs, the IFG section is adjusted to last for 24 μs. In other words, according to the amount of time delayed by the modulator 307, the DAC 308, and the channel 302 inside a terminal, the apparatus for generating a time slot according to the present invention, which is included in the MAC 301, selects the time period of the IFG section from between 24 μs and 29 μs. Accordingly, the IFG section lasts for 29 μs in the WI line irrespective of time delay caused by the modulator 307, the DAC 308, and the channel 302 inside the terminal. Therefore, it is possible to meet the home PNA 2.0 standards, in which the transmission of a BOS section and a priority slot section must be started within 4 μs after the starting point of each time slot.

Figure 6:
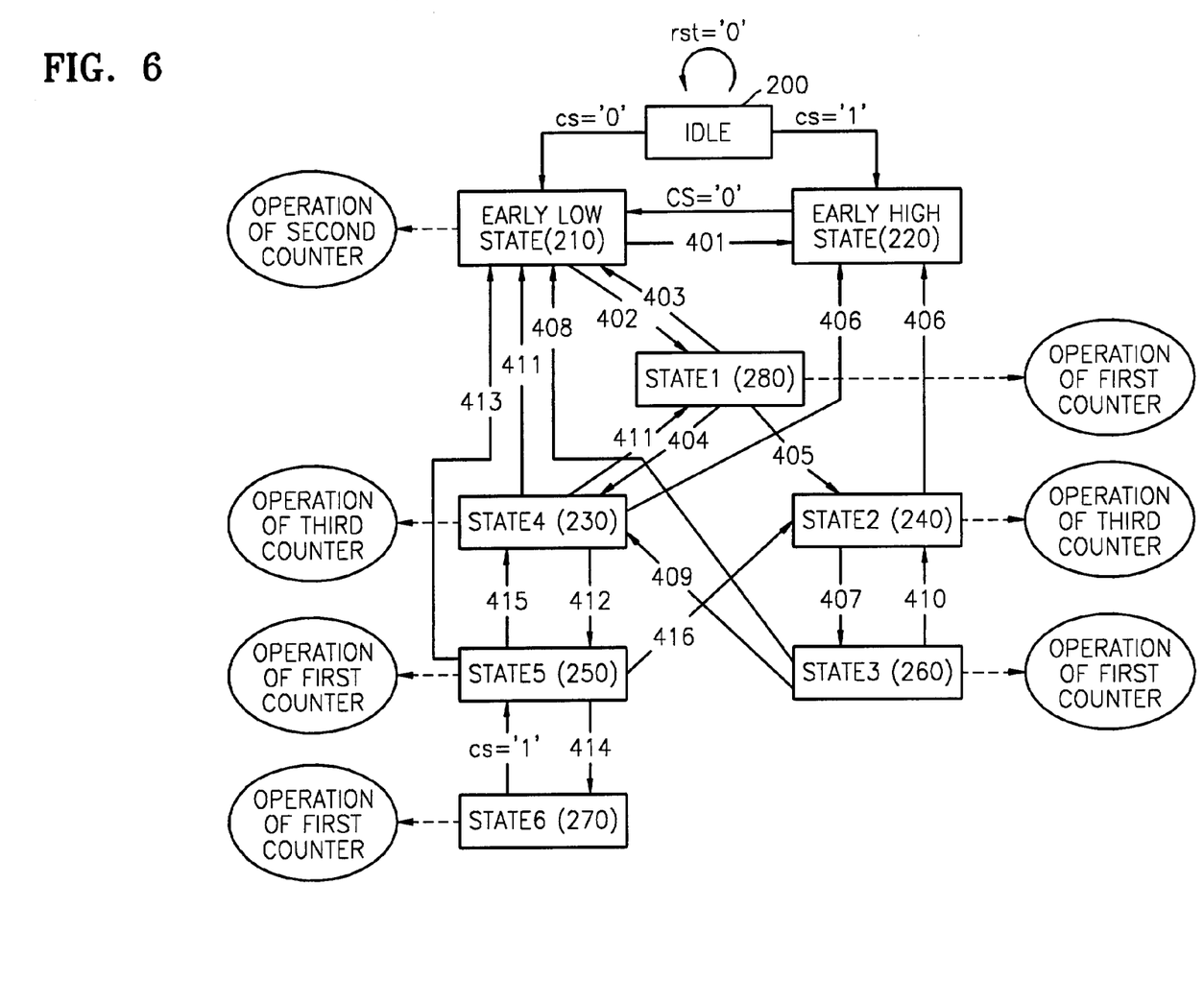
FIG. 6 is a diagram showing the operation of a signal analyzer shown in FIG. 1.

FIG. 6 is a diagram showing the operation of the signal analyzer 10 shown in FIG. 1.

The following table shows the conditions of each branch shown in FIG. 6, and the conditions of variation from a certain state to another state are shown in Table 1.

TABLE 1

| 401 | CS_Low1 < IFG |
| 402 | CS_Low1 > IFG |
| 403 | CS_High < CD_MIN (32 μs) |
| 404 | 32 μs CS_High < 92.5 μs; collision |
| 405 | 32 μs CS_High < 92.5 μs; |
| 406 | CS_Low2 < IFG |
| 407 | CS_Low2 > IFG |
| 408 | CS_High < 32 μs |
| 409 | 32 μs ≤ CS_High < 92.5 μs; collision |
| 410 | CS_High ≥ 92.5 μs; valid_cs_frame |
| 411 | CS_Low2 ≥ IFG + (BOS × 3) |
| 412 | IFG ≤ CS_Low2 < IFG + (BOS × 3) |
| 413 | CS_High < 9 μs, 17 μs < CS_High < 32 μs |
| 414 | 9 μs ≤ CS_High ≤ 17 μs |
| 415 | 32 μs ≤ CS_High < 92.5 μs; collision |
| 416 | CS_High ≥ 92.5 μs; valid_cs_frame |

Referring to FIGS. 1 and 6 and Table 1, when the signal analyzer 10 is reset, the signal analyzer 10 is in an idle state 200. Later, an input carrier sense signal CS may be in a high or low state. The signal analyzer 10 determines whether or not data is normally received or whether or not data collision occurs and generates a time slot based on the result of the determination. If the carrier sense signal CS which is in a high state is input in the idle state 200, the signal analyzer 10 waits until the carrier sense signal CS becomes low. On the other hand, if the carrier sense signal CS which is low is input in the idle state 200, the state of the signal analyzer 10 changes from the idle state 200 to an early low state 210. Then, the signal analyzer 10 generates the second counter control signal CNT2 to allow the second counter 14 to count the clock signal CLK and thus check the duration of the low section of the carrier sense signal. As the result of the counting, if the low state of the carrier sense signal CS is determined to last for no less than 293 μs, which is the same as the sum of all time periods of the time slot shown in FIG. 3, the carrier sense signal CS is determined to belong to an unsynchronous section where data can be transmitted any time. The time slot generator 18 shown in FIG. 1 outputs a signal for indicating the unsynchronous section.

If a counter value CS_Low1 of the second counter 14 in the early low state 210 is shorter than 29 μs, which represents the duration of an IFG section, as shown in 401 condition of Table 1, the state of the signal analyzer 10 changes from the early low state 210 to an early high state 220, and generation of a new time slot is prevented. In other words, in a case where a carrier sense signal CS is shorter than 29 μs, the carrier sense signal CS is determined as being caused by noise and is ignored.

In the early low state 210, if the length of the low section counted by the second counter 14 is no less than 29 μs, the signal analyzer 10 determines the low section as an IFG section, and the state of the signal analyzer 10 changes from the early low state 210 to state 1 (280). The signal analyzer 10 generates the first counter control signal CNT1 and checks the duration of a high section of the carrier signal. If the high state of the carrier sense signal CS lasts for no less than 92.5 μs in the state 1 (280), the signal analyzer 10 determines that normal data is received. When the carrier sense signal CS becomes low, the state of the signal analyzer 10 changes (405) from the state 1 (280) to state 2 (240), and the signal analyzer 10 outputs a state signal S1 for indicating that data is normally received and a counter value CS_Low2 provided from the second counter 14 to the time slot generator 18. The time slot generator 18 generates an appropriate time slot in response to the state signal S1 by using the counter value CS_Low2.

Next, in the state 2 (240), the signal analyzer 10 compares the counter value CS_Low2 with the length of the IFG section. If the counter value CS_Low2 is smaller than the length of the IFG section, the signal analyzer 10 determines that a wrong carrier sense signal CS is received. Then, the state of the signal analyzer 10 changes (406) to the early high state 220, and simultaneously, the signal analyzer 10 generates an error signal ER for indicating that the carrier sense signal CS has an error to the time slot generator 18. The time slot generator 18 initializes the time slot in response to the error signal ER and generates a new time slot. On the other hand, if the counter value CS_Low2 is greater than the length of the IFG section in the state 2 (240), the signal analyzer 10 is maintained to be in the state 2 (240) for a while. Then, the state of the signal analyzer 10 changes (407) from the state 2 (240) to state 3 (260) when the carrier sense signal CS becomes high, and the signal analyzer 10 generates the first counter control signal CNT1 to allow the first counter to count the high section of the carrier sense signal CS.

If a counter value CS_High of the first counter 12 is no less than 92.5 μs in the state 3 (260), the state of the signal analyzer 10 changes (409) from the state 3 (260) to state 4 (230). If the counter value CS_High is no less than 32 μs and less than 92.5 μs, the signal analyzer 10 determines that data collision occurs. Then, the state of the signal analyzer 10 changes (408) from the state 3 (260) to the early low state 210, and the time analyzer 10 begins to generate a new time slot.

If the counter value CS_High is no less than 32 μs and less than 92.5 μs in the state 1 (280), the signal analyzer 10 determines that data collision occurs, and the state of the signal analyzer 10 changes from the state 1 to the state 4 (230). Next, the signal analyzer 10 generates the second counter control signal CNT2 to allow the second counter 14 to count the low section of the carrier sense signal CS. Referring to FIG. 2(b), even in a case where data collision occurs, the carrier sense signal CS must be maintained in a low state for as much as the length of the IFG section. If the low section of the carrier sense signal CS do not last for as much as the length of the IFG section in the state 4 (230), the signal analyzer 10 determines that the carrier sense signal CS has an error, and the state of the signal analyzer 10 changes (417) from the state 4 (230) to the early low state 210. In addition, referring to FIG. 3, the IFG section and the BOS sections must come after data collision occurs. Thus, the period of time, for which the low state of the carrier sense signal CS lasts, must be shorter than the sum of the time periods of the IFG section and the BOS sections, as shown in the 412 conditions of Table 1. In other words, if the counter value CS_Low2 of the second counter 16 meets the 412 conditions of Table 1 in the state 4 (230), the signal analyzer 10 determines that a BOS signal is normally generated, and the state of the signal analyzer 10 changes (412) from the state 4 (230) to state 5 (250). If the counter value CS_Low2 is shorter than the length of the IFG section in the state 5 (250), the signal analyzer 10 determines that the carrier sense signal CS has an error, and the state of the signal analyzer 10 changes (460) from the state 5 (250) to the early high state 220. Next, the signal analyzer 10 outputs the error signal ER to the time slot generator 18 to stop generating a time slot. If the counter value CS_Low2 meets the 411 conditions of Table 1 in the state 5 (250), in other words, if the counter value CS_Low2 is greater than the sum of the time periods of the IFG section and the BOS sections, the signal analyzer 10 determines that the BOS signal is not generated, and the state of the signal analyzer 10 changes (411) from the state 5 (250) to the early low state 210. The signal analyzer 10 generates the error signal ER to the time slot generator 18 to make the time slot generator 18 abandon the time slot being currently generated and generate a new time slot.

In the state 5 (250), the signal analyzer 10 generates the first counter control signal CNT1 to allow the first counter 12 to count the clock signal CLK and determines whether or not the carrier sense signal CS is maintained at a high state for as long as the duration of the BOS, in other words, whether or not the 414 conditions of Table 1 are satisfied. If the high state of the carrier sense signal CS lasts for as long as the duration of the BOS, the state of the signal analyzer 10 changes from the state 5 (250) to state 6 (270). According to the home PNA 2.0 standards, the BOS signal must be maintained at a high level for 10 µs, as described above. However, as shown in the 414 conditions of Table 1, a signal lasting for 9-17 µs is considered as the BOS signal. The signal analyzer 10 is maintained in the state 6 (270) for a while, and then the state of the signal analyzer 10 moves to the state 5 (250) when the carrier sense signal CS becomes high.

If the 415 conditions of Table 1 are satisfied in the state 5 (250), in other words, if the first counter value CS_High is no less than 32 µs and less than 92.5 µs, the signal analyzer 10 determines that data collision occurs, and the state of the signal analyzer 10 moves (415) to the state 4 (230). The signal analyzer 10 outputs the state signal S1 for indicating that data collision occurs and the counter value CS_Low2 to the time slot generator 18. If the 416 conditions of Table 1 are satisfied in the state 5 (250), in other words, if the second counter value CS_High is no less than 92.5 µs, the signal analyzer 10 determines that data is normally received, and the state of the signal analyzer 10 moves (416) to the state 2 (240). The signal analyzer 10 outputs the state signal S1 for indicating that data is normally received and the counter value CS_Low2 of the third counter 16 to the time slot generator 18. If none of the 415 conditions, 414 conditions, and 416 conditions of Table 1 are satisfied, in other words, if the 413 conditions of Table 1 are satisfied, the signal analyzer 10 determines that the carrier sense signal CS has an error, and the state of the signal analyzer 10 moves (413) to the early low state 210. Then, the signal analyzer 10 outputs the error signal ER to the time slot generator 18 to make the time slot generator 18 stop generating a time slot.

As described above, the signal analyzer 10 can determine whether or not the carrier sense signal CS being currently input has an error using a counting value output from the counting unit 20, and accordingly, it is possible to generate a precise time slot by controlling the operation of the time slot generator 18 based on the result of the determination.

The present invention can be realized as a code, which can be written on a recording medium that can be read by a computer and can be read by a computer. The recording medium that can be read by a computer includes all kinds of recording media, on which data that can be read by a computer system are written, such as a read only memory (ROM), a random access memory (RAM), a CD-ROM, a magnetic tape, a floppy disk, an optical data storage, and a carrier wave type (e.g., transmission over the Internet). The recording medium that can be read by a computer can be dispersed into computer systems connected to one another on a network, and codes that can be read by a computer can be stored in the recording medium in a dispersion manner and can be performed.

As described above, in the apparatus for generating a time slot according to the present invention and the method thereof, a signal analyzer determines whether or not an error happens to a carrier sense signal CS being currently input using a counting value output from a counting unit and controls generation of a time slot based on the result of the determination. It is possible to generate a reliable time slot by taking delay of time occurring inside a device including the apparatus for generating a time slot into consideration.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for generating a time slot in a home networking system for networking of information terminals, which is included in each of the information terminals and shows the time when data is transmitted, the apparatus comprising:

a signal analyzer which receives a carrier sense signal indicating whether or not data exists on a network line, generates a counter control signal according to a first level of the carrier sense signal and a second level of the carrier sense signal where the second level is complementary to the first level, recognizes a length of the first level and the second level of the carrier sense signal using counter values provided in response to the counter control signals, outputs a state signal for indicating whether or not effective data is received, whether or not data collision occurs, or whether or not an error happens to the carrier sense signal and a time counting value for generating a time slot using the length of the first level and the second level of the carrier sense signal;

a counting unit which counts a clock signal in the first level and the second level of the carrier sense signal in response to the counter control signal and outputs the result of the counting as the counter values; and a time slot generator which has regulations related to the period of time of each section of a time slot, generates a time slot according to the state signal output from the signal analyzer using the time counting value to meet the regulations, and stops generation of the time slot in response to the state signal for indicating that an error happens to the carrier sense signal.

2. The apparatus of claim 1, wherein unless a predetermined carrier sense signal generated in a case where effective data is received or a case where data collision occurs is received, the signal analyzer determines that an error happens to the carrier sense signal.

3. The apparatus of claim 1, wherein the counting unit comprises: a first counter which is enabled for as much as the period of time, for which the carrier sense signal is maintained at the first level, in response to the counter control signal, counts the clock signal, and outputs the result of the counting to the signal analyzer;

a second counter which is enabled in response to the counter control signal to detect an interframe gap section, in which the carrier sense signal is maintained at the second level for at least a predetermined period of time between frames, counts the clock signal, and outputs the result of the counting to the signal analyzer; and a third counter which is enabled for as much as the period of time, for which the carrier sense signal is maintained at the second level, in response to the counter control signal, after the interframe gap section is detected, counts the clock signal, and outputs the result of the counting to the signal analyzer as the time counting value.

4. The apparatus of claim 1, wherein the time slot generator adjusts the interframe gap in the time slot in response to the amount of time delayed inside the each of the information terminals.

5. A method for generating a time slot performed in an apparatus for generating a time slot which is included in each information terminal and shows the time when data is transmitted in a home networking system for networking of information terminals, the method comprising:

(a) receiving a carrier sense signal indicating whether or not data exists on a network line, recognizing a duration of a first level of the carrier sense signal and a duration of a second level of the carrier sense signal by counting clock signal in the first level and the second level of the carrier sense signal, determining whether or not effective data is received, whether or not data collision occurs, or whether or not an error happens to the carrier sense signal using the duration of the first level and the second level of the carrier sense signal;

(b) generating a time slot corresponding to the result of the determination if it is determined that effective data is received or it is determined that data collision occurs; and (c) stopping generation of the time slot if it is determined that an error happens to the carrier sense signal, and standing by to generate a new time slot.

6. The method of claim 5, wherein if the carrier sense signal is maintained at a first level, which indicates that data is being received, for at least the total time of a predetermined time slot, a signal for indicating that it is an asynchronous section, during which the information terminal can transmit data anytime, is output.

7. A recording medium being a storage device, on which the method of claim 6 is written as program codes that can be operated in a computer.

8. The method of claim 5, wherein the step (a) comprises:

(a1) measuring the duration of a second level of the carrier sense signal where the second level is complementary to the first level;

(a2) determining the duration of the second level of the carrier sense signal as the interframe gap section if the duration of the second level of the carrier sense signal is longer than a first predetermined period of time, and measuring the duration of the first level of the carrier sense signal when the level of the carrier sense signal is changed into the first level, and (a3) determining whether or not data is normally received, whether or not data collision occurs, or whether an error happens to the carrier sense signal based on the duration of the first level of the carrier sense signal measured in the step (a2).

9. The method of claim 8, wherein the step (a3) comprises:

(a31) determining that an error happens to the carrier sense signal if the duration of the first level of the carrier sense signal is shorter than a second predetermined period of time;

(a32) determining whether or not data collision occurs by determining whether or not a carrier sense signal maintained at the second level for a predetermined period of time, which is no less than the period of time corresponding to the length of the interframe gap section and is no longer than a fourth predetermined period of time, is received after a carrier sense signal maintained at the first level for a predetermined period of time, which is no less than the second predetermined period of time and no longer than a third predetermined period of time, is generated; and (a33) determining whether or not data is normally received by determining whether or not a carrier signal maintained at the second level for the predetermined period of time corresponding to the length of the interframe gap section is received after a carrier sense signal maintained at the first level for at least the third predetermined period of time is generated.

10. The method of claim 9, wherein the fourth predetermined time period corresponds to the sum of the lengths of the interframe gap section and a back-off signal section.

11. A recording medium being a storage device, on which the method of claim 10 is written as program codes that can be operated in a computer.

12. The method of claim 9, wherein if a carrier sense signal maintained at the second level for a predetermined period of time, which is less than the interframe gap section or longer than the fourth predetermined time period, is received in the step (a32), the carrier sense signal is determined as a wrong signal or being caused by noise, and the step (c) is performed.

13. A recording medium being a storage device, on which the method of claim 12 is written as program codes that can be operated in a computer.

14. A recording medium being a storage device, on which the method of claim 9 is written as program codes that can be operated in a computer.

15. A recording medium being a storage device, on which the method of claim 8 is written as program codes that can be operated in a computer.

16. The method of claim 5, wherein the time slot in the step (b) has the interframe gap section, and the interframe gap section is adjusted in response to the amount of time delayed inside the information terminal.

17. A recording medium being a storage device, on which the method of claim 16 is written as program codes that can be operated in a computer.

18. A recording medium being a storage device, on which the method of claim 5 is written as program codes that can be operated in a computer.

* * * * *